US005712452A

United States Patent [19]

Lin

[11] Patent Number: 5,712,452

[45] Date of Patent: Jan. 27, 1998

[54] SOUND GENERATOR

[76] Inventor: Mo-Hsin Lin, 5th Fl., No. 4, Lane 7, Pao Kao Road, Hsintien, Taipei Hsien, Taiwan

[21] Appl. No.: 773,447

[22] Filed: Dec. 26, 1996

[51] Int. Cl.$^6$ .............................. G01K 11/00; A63H 3/31

[52] U.S. Cl. ............................ 181/0.5; 446/192; 446/193

[58] Field of Search ............................ 181/0.5, 142, 157, 181/160, 170; 446/192, 193, 183, 184, 188, 197, 213; 84/411 M, 411 R, 419, 420

[56] References Cited

U.S. PATENT DOCUMENTS

| | | | |
|---|---|---|---|
| 1,039,814 | 10/1912 | Sacavem | 446/193 |
| 4,391,061 | 7/1983 | Fogarty et al. | 446/193 |
| 4,757,739 | 7/1988 | Yeh | 84/411 R |
| 5,419,730 | 5/1995 | Diresta et al. | 446/193 |
| 5,522,756 | 6/1996 | Barthhold | 446/193 |

*Primary Examiner*—Khanh Dang
*Attorney, Agent, or Firm*—Bacon & Thomas

[57] ABSTRACT

An improved sound generator includes a vibrating plate and a casing. The vibrating plate may become concave upon pressure and may return to its convex shape automatically to generate vibration and thus sound. An elastic plate is attached to the convex surface of the vibrating plate. The elastic plate is made of a material which may quickly return to its normal state after being compressed. The elastic plates prevents direct contact between an object or finger exerting a force and the vibrating plate, which may reduce the amplitude and thus the sound generated. The elastic plate absorbs the external force and release instantly its potential energy to counter the force exerted thereon so that the deformation of the vibrating plate may speed up to enhance the amplitude and sound volume. The sound generator may be used in toys or to substitute conventional castanets.

1 Claim, 4 Drawing Sheets

SOUND GENERATOR

BACKGROUND OF THE INVENTION (a) Field of the Invention

The present invention relates generally to an improved sound generator, and more particularly to an improved sound generator with increased amplitude and sound volume adapted for use in toys or as a substitute for conventional castanets.

(b) Description of the Prior Art

As shown in FIG. 1, the conventional sound generator basically comprises a casing 1 and a vibrating plate 2. The vibrating plate 2 may be divided into a convex portion 21 and a tapered surface portion 2. the latter is fixedly connected to a protrudent ring 13 at an upper portion of the casing 1. A resonance chamber 11 is formed inside the casing 1, and a sound outlet 12 is disposed at a lower portion of the casing 1. When an external force is exerted upon the upper portion of the vibrating plate 2, it will become concave in shape and vibrate to generate sound. When the exerted force diminishes or disappears, the vibrating plate 2 will return to its normal shape, vibrating to generate sound at the same time. When the frequency of the sound is the same as that of resonance chamber 11, a louder sound may be generated.

As it requires the pressing by an object or a finger on the convex surface of the vibrating plate 2 to generate sound, the amplitude of the vibrating plate 2 will decrease due to the pressure of the object or the finger, thus lowering the sound generated.

Furthermore, as the vibrating speed will slow down during deformation of the vibrating plate 2, the amplitude as well as the sound thus generated will decrease relatively. Therefore, although there is provided a resonance chamber 11 in the casing to increase the sound volume, the effect is still limited.

In order to solve the above-mentioned problems, it is necessary to provide an intermediate material between the object or finger exerting the pressure and the vibrating plate 2. The intermediate material must not be rigid and must have elasticity so that the amplitude of the vibrating plate 2 will not be weakened due to pressure exerted thereon by an external object or finger.

A critical factor in increasing the sound volume lies in how to speed us the vibrating speed during deformation of the vibrating plate 2 and how to enhance the resilience of the vibrating plate 2 and to allow quick release of the pressure on the vibrating plate when the vibrating plate 2 automatically returns to its convex shape.

SUMMARY OF THE INVENTION

Accordingly, a primary object of the present invention is to provide an improved sound generator capable of generating relatively loud sound for use in toys and as substitutes for conventional castenets.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
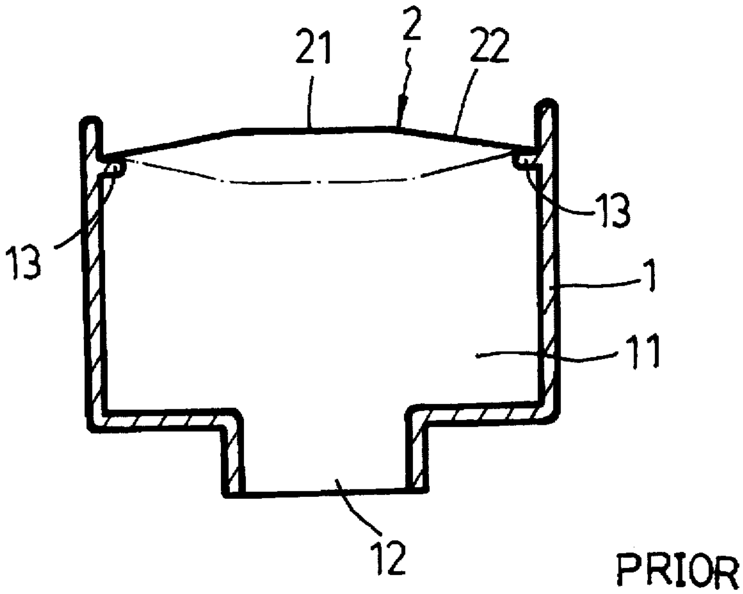
PRIOR ART FIG. 1
FIG. 1 is a sectional view of a conventional sound generator.

With reference to FIGS. 3–6, the sound generator according to the present invention essentially comprises a casing 1, a vibrating plate 2 and an elastic plate 3. The casing 1 is internally provided with a resonance chamber 11 and a sound outlet 12 at a lower portion thereof. The resonance chamber 11 may enhance the volume of the sound thus generated by means of resonance, and the sound outlet 12 allows the sound to be transmitted to the outside. The vibrating plate 2 includes a convex portion 21 and a tapered portion 22. The tapered portion 22 has its periphery fixed connected to a protrudent ring 13 at an upper portion of the casing 1. When the convex portion 21 is pressed, the entire vibrating plate 2 will deform in shape and become concave (see FIG. 6). When the pressure diminishes or completely disappears, the vibrating plate 2 will return to its normal convex shape (see FIGS. 3 and 4). Sound will be generated during deformation of the vibrating plate 2 as a result of the vibration of the vibrating plate 2.

The present invention is characterized in that the elastic plate 3 is attached to the convex portion 21 of the vibrating plate 2. The elastic plate 3 is made of an elastic material which may quickly return to its normal state after being compressed, such as relatively high density foam rubber or high elasticity rubber. The elastic plate 3 also functions to provide an indirect contact between the object or finger exerting the pressure and the vibrating plate 2 to prevent weakening of the amplitude due to direct contact between the object or finger exerting the pressure and the vibrating plate 2. Therefore, the elastic plate 3 disposed on top of the vibrating plate 2 may enhance the volume of the sound thus generated.

Figure 5:
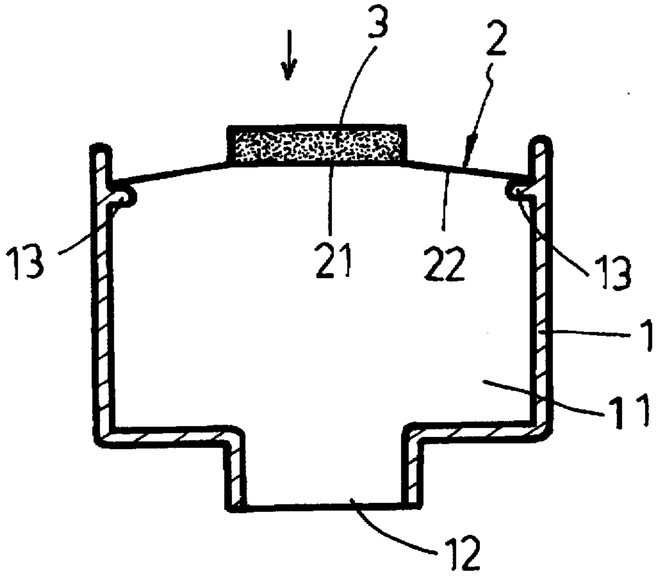
FIG. 5 is a sectional view illustrating the improved sound generator of the invention when the elastic plate is being compressed.
Figure 6:
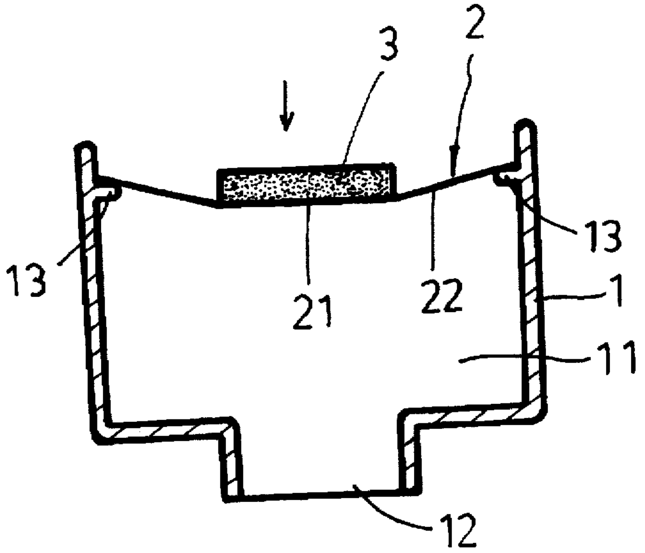
FIG. 6 is a sectional view illustrating the improved sound generator of the invention when the vibrating plate is being pressed to become concave in shape.

The primary function of the elastic plate 3 is to speed up the vibration of the vibrating plate 2 during deformation so as to relatively generate a greater amplitude and sound volume. Referring to FIG. 5, when an external force is exerted upon the elastic plate 3, the elastic plate 3 will absorb the force and become compressed, thus possessing potential energy due to decrease in functioning height. With reference to FIGS. 5 and 6, when the pressure exerted on the elastic plate continues to increase in magnitude until it exceeds the critical load endurable by the vibrating plate 2, the elastic plate 3 will instantly release its energy and, aided by the sustained pressure thereon, cause the vibrating plate 2 to deform in shape and vibrate in an increased speed, resulting in a greater amplitude and sound volume. The sound thus generated may be several times greater than that generated by conventional sound generators.

Figure 4:
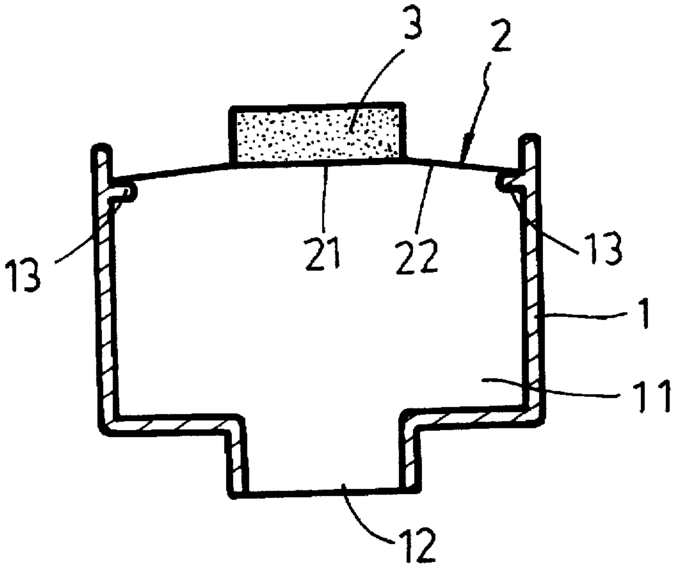
FIG. 4 is a sectional view taken along line 4—4 of FIG. 3.

With reference to FIGS. 4 and 6, when the object or finger exerting the force moves downwardly to press an upper portion of the thus sunken elastic plate 3, the elastic plate 3 which has released its potential energy will become compressed again due to inertia, and produce a counter force against the object or finger so as to increase the resetting force of the vibrating plate 2, thus speeding up the release of the object or finger from the elastic plate 3. Relatively, the resetting speed of the vibrating plate 2 will increase. In other words, the amplitude and sound volume will increase. The sound volume is commensurate with that generated when the vibrating plate 2 becomes concave.

Figure 7:
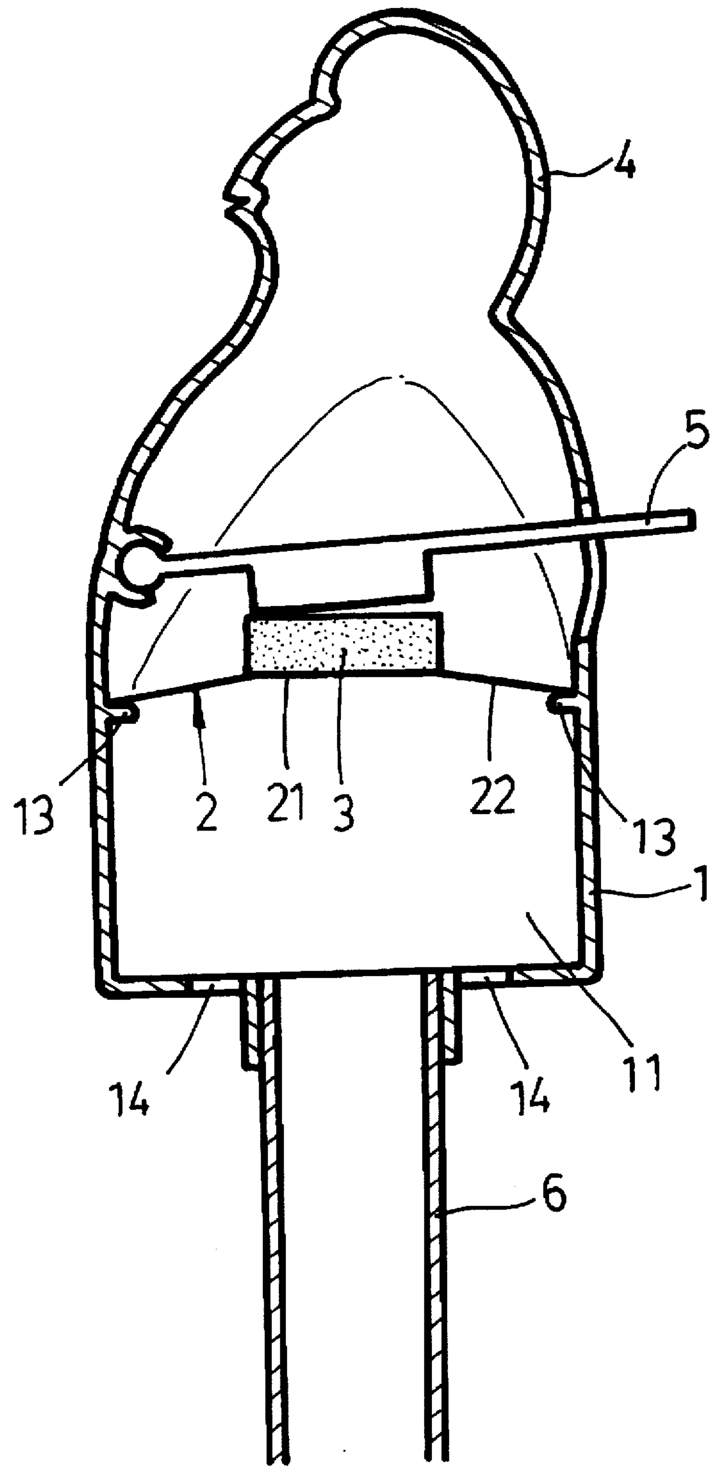
FIG. 7 is a sectional view illustrating an embodiment using the present invention.

Reference is now made to FIG. 7. The casing 1 has a toy frog 4 fixedly connected to an upper portion thereof. A grip stem 6 is insertably connected to a lower portion of the casing 1. The user may hold the grip stem 6 with one hand and press a press lever 5 to generate a sound effect. In this embodiment, a sound outlet 14 may be disposed at the lower portion of the casing 1 to allow the sound to be transmitted to the outside.

Figure 2:
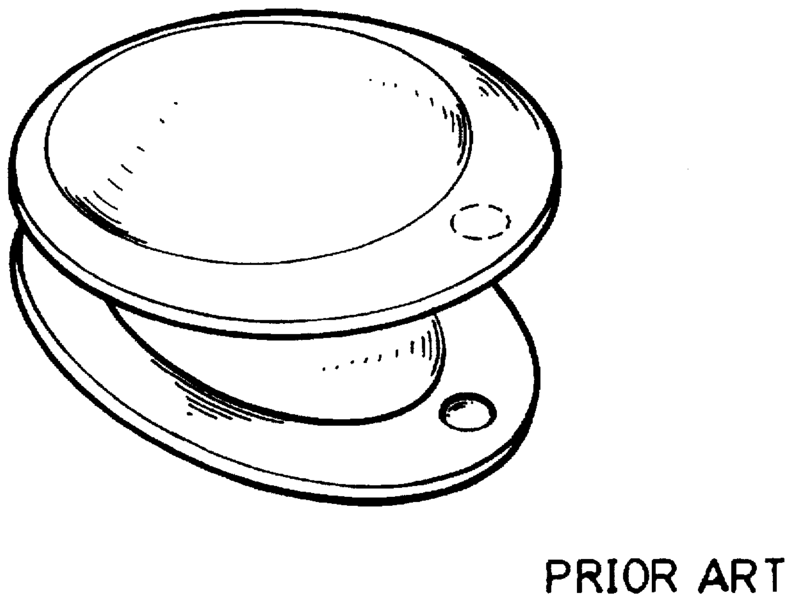
PRIOR ART FIG. 2
FIG. 2 is an elevational view of the conventional castanets.
Figure 3:
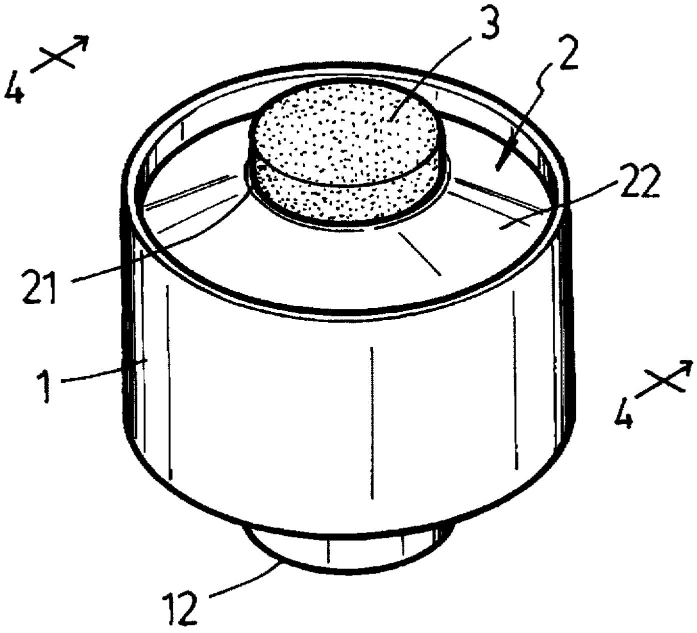
FIG. 3 is an elevational view of the improved sound generator according to the present invention.

In addition of being adapted for use in toys, the present invention may also be used to substitute the conventional castenets as shown in FIG. 2.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved sound generator comprising at least one vibrating plate and one casing, said vibrating plate being comprised of a convex portion and a tapered portion having its periphery fixedly connected to said casing, said convex portion becoming concave in shape when subjected to an external force and returning to its convex shape automatically to generate vibrations and thus sound, wherein an elastic plate is attached to an outer surface of said convex portion of said vibrating plate, said elastic plate being made of an elastic material so that it may quickly return to its normal state after being compressed, said elastic plate providing an indirect contact between an object or finger exerting a force and said vibrating plate so that the amplitude of said vibrating plate is not weakened by direct contact between the object or finger exerting the force and said vibrating plate, and said elastic plate being provided to absorb the external force and to release its potential energy to generate a counter force against the object of finger exerting the force thereon so that vibration of the vibrating plate is increased to enhance the amplitude and sound volume.

* * * * *